United States Patent
Dumoulin

(10) Patent No.: US 9,228,837 B2
(45) Date of Patent: Jan. 5, 2016

(54) LIGHT DETECTION CIRCUIT

(75) Inventor: Charles Leopold Elisabeth Dumoulin, Balgach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 180 days.

(21) Appl. No.: 14/238,830

(22) PCT Filed: Aug. 14, 2012

(86) PCT No.: PCT/EP2012/065917
§ 371 (c)(1),
(2), (4) Date: Feb. 13, 2014

(87) PCT Pub. No.: WO2013/024103
PCT Pub. Date: Feb. 21, 2013

(65) Prior Publication Data
US 2014/0338205 A1  Nov. 20, 2014

(30) Foreign Application Priority Data
Aug. 16, 2011  (EP) .................................. 11177646

(51) Int. Cl.
*G01J 1/42* (2006.01)
*G01C 15/00* (2006.01)
(Continued)

(52) U.S. Cl.
CPC ............ *G01C 15/002* (2013.01); *G01C 15/006* (2013.01); *G01J 1/42* (2013.01); *G01J 1/4257* (2013.01); *G01J 1/44* (2013.01); *G01J 1/46* (2013.01); *G01J 2001/446* (2013.01)

(58) Field of Classification Search
CPC ............ G01J 1/42; G01J 1/4257; G01C 1/04; G01C 15/004
See application file for complete search history.

(56) References Cited

U.S. PATENT DOCUMENTS

| 3,649,122 A | 3/1972 | Holtz |
| 3,894,230 A | 7/1975 | Rorden et al. |

(Continued)

FOREIGN PATENT DOCUMENTS

| CN | 1559089 A | 12/2004 |
| CN | 101910824 A | 12/2010 |

(Continued)

OTHER PUBLICATIONS

European Search Report dated Jan. 31, 2012 as received in Application No. EP 11 17 7646.

*Primary Examiner* — Tony Ko
(74) *Attorney, Agent, or Firm* — Maschoff Brennan

(57) ABSTRACT

An electronic light detection circuit for detecting an intensity modulated light signal on a photosensitive element under backlight condition. The circuit comprises the photosensitive element, in particular as a light position detector for detecting a striking position of the light signal spot within a detection window, an amplifier with high input resistance connected to an output of the photosensitive element and a backlight suppression circuitry.

The backlight suppression circuitry is connected to the output of the photosensitive element in parallel to the amplifier and comprises an electronic active resonator structure. The active resonator, structure is designed in such a way to provide a load impedance to an output of the photosensitive element with a low load impedance for low frequencies for suppression of natural and artificial backlight-saturation of the photosensitive element and a high load impedance at the frequency of the intensity modulated light signal.

22 Claims, 9 Drawing Sheets

(51) Int. Cl.
*G01J 1/46* (2006.01)
*G01J 1/44* (2006.01)

(56) References Cited

U.S. PATENT DOCUMENTS

| | | | |
|---|---|---|---|
| 4,676,634 A | 6/1987 | Petersen | |
| 4,732,471 A | 3/1988 | Cain et al. | |
| 4,756,617 A | 7/1988 | Cain et al. | |
| 4,830,489 A | 5/1989 | Cain et al. | |
| 4,907,874 A | 3/1990 | Ake | |
| 4,976,538 A | 12/1990 | Ake | |
| 5,886,776 A | 3/1999 | Yost et al. | |
| 6,133,991 A | 10/2000 | Ake | |
| 6,435,283 B1 | 8/2002 | Ohtomo et al. | |
| 6,574,252 B1 * | 6/2003 | Choi | H01S 3/1022 372/29.02 |
| 6,747,266 B2 | 6/2004 | Yamazaki et al. | |
| 6,750,953 B1 | 6/2004 | Douglas | |
| 7,012,237 B1 | 3/2006 | Ake | |
| 7,307,738 B2 | 12/2007 | Winter et al. | |
| 7,339,154 B2 | 3/2008 | Katayama | |
| 7,372,011 B2 | 5/2008 | Green et al. | |
| 7,394,527 B2 | 7/2008 | Essling et al. | |
| 8,945,472 B2 | 2/2015 | Kahlman et al. | |
| 2003/0174305 A1 | 9/2003 | Kasper et al. | |
| 2005/0103974 A1 | 5/2005 | Hsiao | |
| 2006/0049337 A1 | 3/2006 | Waeny et al. | |

FOREIGN PATENT DOCUMENTS

| | | |
|---|---|---|
| DE | 195 40 590 A1 | 4/1996 |
| EP | 1 484 577 A1 | 12/2004 |
| JP | 04-046282 | 2/1992 |
| JP | 05-223922 A | 9/1993 |
| KR | 10-2011-0039808 A | 4/2011 |

\* cited by examiner

LIGHT DETECTION CIRCUIT

FIELD OF INVENTION

The present invention relates generally to an electronic light detection circuit for detecting an intensity modulated light signal on an photosensitive element under a backlight condition and to a method for evaluating a light spot in a backlight condition.

BACKGROUND

In the technical field of laser leveling, a laser rotator or a line laser is used to span a leveling plane which can be horizontal, vertical or tilted by a desired angle. The laser plane is often detected by a laser receiver, which detects the striking position of the laser inside a detection window to determine the receiver's position relative to the laser plane. The detection window, or receiver window, is the area at the laser receiver device, which is embodied to detect the light beam. The position of the light beam's striking point within the detection window is detected for determining the position of the laser-beam's optical axis relative to the receiver device in at least one direction. In many embodiments, the center— in half of the detection windows length—is the desired level of the laser beam and the receiver indicates a deviation from this ideal position by indicative or quantifying means. The electronic reception of the laser beam allows an extension of the distance range of the laser leveling, usability under sunlight conditions, etc. compared to manual observation of the projected laser plane. Many types of laser receivers are known, with many different functional, performance and cost advantages compared to their competitors. The devices can comprise many additional features like optical level indication, acoustic level indication, distance determination, angle determination, data communication, receiver-rotator pairing, etc., which are not the primary scope of the present invention.

Some examples of such laser leveling implementations are U.S. Pat. No. 6,435,283 showing a rotating single beam laser transmitter, or U.S. Pat. No. 4,756,617 showing a continuous 360° laser plane generated by directing a laser at a conical surface, wherein typically an amplitude modulated laser source is used. Those two principles of projecting a laser line are also referred to as line lasers with a scanning line or line lasers with a continuous laser line, wherein the light can be modulated.

A rotating or scanning laser beam transmitter produces a beam that sweeps past the receiver and generates laser pulses of short duration but of high bandwidth in the detection window. In contrast, continuous laser transmitters generate a continuous laser signal of a narrow bandwidth at the modulation frequency. Although the sensor element of the receiver (and many other parts of the receiver) can be the same for both types of laser levels, the signal conditioning and evaluation in the receiver can be different. The invention presented herein relates to rotating beam transmitters, but is also valid for modulated continuous beam laser transmitters.

In many cases of use, the laser receiver is attached to a leveling rod or to machinery which has to be leveled. The point of intersection of the laser plane at the reception window of the receiver is determined by measuring the striking position of the beam's optical axis within the receiving window. This position is indicated to the user, in particular as a deviance from a desired striking position at the desired leveling position.

There are multiple techniques known to determine the striking position of the laser in the receiver window. One approach of determining the position of a light beam is by usage of photodiodes or arrays of photodiodes.

U.S. Pat. No. 3,649,122 describes a line of separate adjacent photo electric units connected in parallel to each other and connected in series with identical resistors. The photocurrent measured between the thus resulting poles gives the position of the point at which the laser beam strikes the receiver relative to the length of the line of photo electric units. Light guides are used to increase the filling/density of the detection window with photo electric units. For the arrangement of the photo electric units, this receiver only yields a stepwise linear response.

U.S. Pat. No. 3,894,230 describes an aligned array of parallel photo detecting devices where each photo-detecting device corresponds to an increment in position. The receiver indicates which photo detection unit first receives a light signal above a predetermined level. A Plexiglas rod is aligned with the sensor array to form a cylindrical lens, increasing the amount of light falling onto the detection array. The apparatus further employs the use of optical filters to reduce the influence of ultra-violet light, bright sunlight or other sources of light. This receiver assumes that the impinging beam shape of the laser beam is circular and that photo detecting units are sufficiently spaced apart. Therefore the range of detection of this receiver is limited.

EP 1,484,577 describes a receiver for amplitude modulated laser beams (100 kHz to 10 MHz) by an intermittent array of (parallel) photodiodes that are connected to a phase shifting circuitry. A light diffusing sensor window is arranged in front of the intermittent array of photodiodes. The light diffuser spreads the laser light in such a manner that when the laser beam impinges on the center between two photodiodes, both diodes are equally illuminated. By this structure this receiver can use fewer photodiodes; however this receiver is only partly linear.

U.S. Pat. No. 7,372,011 describes a linear array of (parallel) photodiodes with associated weighting circuits. The weighting circuits are used to determine whether the receiver has been struck by a laser beam or by another strobe light. For shunting D.C. sunlight current, the receiver uses inductors referenced to ground.

U.S. Pat. No. 7,339,154 and JP 04046282 show a sensor stage with a parallel array of photodiodes weighted with a circuit based on an, arrangement of resistors in series. The load resistors $R_h$ and $R_l$ are preferably dimensioned such that the sum of the weighing resistors is considerably larger than the load resistors.

Besides single photodiodes as used above, also BiCells are used, as dual photodiodes, placed on a rectangle with a typically long aspect ratio and which are electrically as well as optically separated by a diagonal, forming two congruent triangles (BiCell). When the laser beam strikes at the upper/lower side of the rectangle, the first photodiode covers the laser beam with a small/large area, whereas the second photodiode is covered with the remaining large/small area. The relationship between the difference of both signals and the sum of both signals is linear. For example, U.S. Pat. No. 4,676,634 shows a BiCell and alternative two photocells in butt-to-butt arrangement with a beam averaging and deadband selection for on-grade stabilization.

U.S. Pat. No. 4,756,617 describes the usage of so called BiCells for a linear determination of the position where the laser beam impinges on the receiver. The use of a passive inductor is described for bypassing the DC and low frequency signals to ground (sunlight protection) by connecting a passive inductor from the BiCell output to Ground. Further, the use of amplitude modulated laser beams is described to increase the peak strength of the laser beam without increasing the regulated RMS (root mean square) value which allows an increase of the maximum distance range of the receiver.

U.S. Pat. No. 6,750,953 shows a position detecting laser receiver with a position detection based on a logarithmic scaling of the BiCells output values. There are also passive inductors from the BiCells outputs to ground.

U.S. Pat. No. 4,830,489 describes a BiCell based laser receiver for linearly determining the relative height of the laser beam. The azimuth position of the receiver is determined at the rotator by means of a back reflected signal by the receiver. A radio is used to communicate the azimuth position as well as the distance of the rotator to the receiver. Far distance measurement, time of flight as well as phase shift measurement methods are proposed.

U.S. Pat. No. 4,907,874 & U.S. Pat. No. 4,976,538 both describe a modified BiCell sensor through a parallel arrangement of the individual interdigitated photo elements combined in two resulting elements with two signals.

U.S. Pat. No. 6,133,991 describes multiple BiCell sensors stacked on top of each other with different sensor shapes and sensor arrangements to reduce the shading effect. The contributing sensor elements are electronically used in parallel.

U.S. Pat. No. 6,747,266 describes an arrangement using an optical filter with a lenticular part capable of expanding the laser beam in scanning direction and a diffusing part capable of diffusing an expanded laser beam with the advantage that a wide laser beam as well as a narrowly focused (scanning) laser beam can be detected by a divided BiCell sensor.

Also, the usage of lightguides in leveling laser receivers is known. For example in DE 195 40 590 an N-type or V-type line shaped optical detection unit is described. The detection units can consist of arrays of photo electrical sensors, bundles of optically transmitting glass or plastic fibers which are aligned in a line at the detection window or a specially made bar consisting of optical material able to conduct the orthogonally impinging laser light to a photo electric sensor at the end of the bar. By using the bars in N-shape or V-shape and measuring the time difference between receipt of signals on either bar, the relative height of the laser beam on the optical receiving elements is determined.

U.S. Pat. No. 7,394,527 and US 2003/0174305 both describe a rotator with at least two signal beams in a given relationship to each other for determining the distance from the receiver to the rotator. The receiver is designed for time resolved reception of these signal beams. Furthermore a receiver is described with two photo sensors on both ends of a light conductor which allows measuring the point where the light beam impinges the light conductor. Using two receivers arranged in a fixed distance allows determining the distance to a rotator by only a single beam. Differentiating two signal generators by emitting at the receivers can take place via different rotational frequencies, coding of the emitted signals, selection of a suitable emission spectrum and similar.

Another known element for the determination of a light point is a PSD (short for Position Sensitive Device), which is well known in industry and is for example used in triangulation sensors as device to detect the position of a (reflected) laser beam.

PSDs according to the understanding of the present application are devices like those based on the lateral photoelectric effect, also referred to as isotropic PSDs or Lateral Effect Photodiodes (LEP) or MOS-Type PSDs. As the presented readout circuitries imply, the PSD substrates referred herein have (at least two) opposed, balanced outputs. The signals on the outputs are dependent on the position of a light beam on the PSD's active surface. The two output signal are reversely dependent on the position (such output behavior is sometimes also referred to as symmetrical output). In view of the known electrical characteristics or equivalent circuits, a significant difference of PSDs compared to BiCells is the resistive connection between the output terminals of a PSD. BiCells are 2 photodiodes, tapered in geometry, which do not provide an electronic interconnect in-between of its opposed signal outputs. Fast-readout CCD or CMOS arrays, which are sometimes also referred as PSDs—since they can also be used to determine the position of a light spot projected on them—are not meant, in particular since their electrical connections and readout characteristics are different. The so called "segmented PSDs" are herein referred to as BiCells.

For ease of understanding, the PSDs in the explanations of the present text are one-dimensional PSDs, although a skilled person is aware of the fact that the same principles are also applicable on a second direction of two dimensional PSDs, wherefore also the evaluation of two dimensional PSDs is part of the present invention.

Although the usage of PSDs for position detection has advantages, the main problem is their low saturation threshold, wherefore, in outdoor conditions with bright sunlight, PSDs have not been used thus far. In particular in outdoor laser leveling applications, PSD sensors suffer from the fact that they easily saturate under sunlight and—relative to photodiodes—have lower signal strength at far distances between the receiver and the laser source. For those reasons, PSD sensors have not been used in a commercial implementation of a laser receiver in building trade e.g. for construction sites, etc.

The signal response of the PSD is somehow similar to that of a BiCell arrangement: providing two continuous signals that increase/decrease with changed position of the incident laser beam. However, there are several technical differences in the use of a BiCell compared to a PSD, for example:

1. There is a phase delay between the signals created by each photodiode of a BiCell. This phase delay has disadvantages during the digitalization of a pulse and is cause to some nonlinearity.

2. The triangular shape of each diode in a BiCell causes some non linearity when being struck by a round or elliptical laser beam because of the difference in point of gravity of the triangular sensor areas and the laser beam intensity distribution.

3. BiCells typically require a larger detection area than PSDs, which results in higher sensor cost and more backlight saturation.

4. When the BiCell is not aligned orthogonally to the laser beam, and a part of the sensor is covered—e.g. by the receiver housing—the sensor will give a wrong height reading. This is also referred to as shading effect. Many solutions have been proposed to solve this inherent BiCell sensor problem.

In leveling applications using "intelligent leveling rods", it is desired to cover large height differences, for example 10 cm or more.

Standard, off the shelf PSD devices with long detection areas are not available, for example PSDs having an active detection length greater than 5 cm or 7 cm or even more than 10 cm. Those few long PSD-devices available, suffer from saturation problems by background light etc. and can not achieve the desired performance which is required for a leveling receiver, wherefore they are commonly not used in such applications.

SUMMARY

An object of the present invention is to provide an improved laser receiver, in particular for leveling applications.

It is an object of the present invention to achieve an increased height range to be covered by the receiver, preferably with maintained or increased height measurement accuracy, especially around the "at level" position.

It is also an object of the present invention to greater leveling distances. Long range leveling can also require an increased sensor length due to beam divergence.

It is therefore an object of the present invention to achieve larger detection windows in light position detection.

It is another object of the present invention to provide an improved light spot position measurement device, in particular in a receiver for leveling applications, preferably using less complex and modular components.

Another object of the invention is also to provide a laser receiver for leveling both, short and long range distances.

A further object is to provide a method and an electrical readout arrangement for photosensitive elements, in particular for a multiple PSD arrangement, capable of detecting the position of a wide span of laser spot diameters, preferably also with a linear readout of the position, also under unfavourable environmental conditions.

A further object of the invention is to provide a laser receiver requiring less power of the received light, whereby the working distance of the receiver can be increased and/or the transmission power requirements of the transmitter can be reduced.

Yet another object of the invention is to provide a laser receiver with an increased receiver window length, in particular with high position accuracy.

Another object of the invention is to increase the receivers positional resolution accuracy for alignment and positioning applications.

Yet another object of this invention is to increase the detection range of the optical elements by minimizing the leveling-signal to noise-signal ration at the receiver.

Both, an increase of the distance range at which the receiver is operable and/or increase of the coverable height range in leveling, require an enlargement of the detection window and the therein comprised sensor(s).

Further analyzing this cognition reveals that the usage of an enlarged sensing area requires a stronger suppression of interferences, backlight, etc., as those effects increase with the sensor length. Therefore maintaining a sufficient sensitivity is per se contradictory to an increase of the photosensitive elements length. Maintaining a sufficient sensitivity is also a contradictory requirement to an increase of backlight and/or noise suppression, as the amount of the backlight picked up by the sensor also increases with its size.

The present invention relates to an electronic light detection circuit for detecting an intensity modulated light signal on a photosensitive element under a backlight condition. The circuit comprises the photosensitive element, in particular as a light position detector for detecting a striking position of the light signal spot within a detection window, an amplifier with high input resistance connected to an output of the photosensitive element, in particular as a transimpedance amplifier, preferably with a subsequent analog to digital converter, and a backlight suppression circuitry.

According to the present invention, the backlight suppression circuitry is connected to the output of the photosensitive element in parallel to the amplifier.

The circuit comprises an electronic active resonator structure, in particular with at least one operational amplifier, designed in such a way to provide a load impedance to an output of the photosensitive element with:

a low load impedance for low frequencies, in particular for the frequency range of zero to twice of mains frequency, for suppression of natural and artificial backlight-saturation of the photosensitive element, and a high load impedance at the frequency of intensity modulation, in particular the load impedance being matched to the impedance of the photosensitive element for transmission of the modulated signal to the amplifier.

The term matched means that the impedance of the active resonator structure at or around modulation frequency is chosen to reduce or eliminate signal losses by the draining circuitry, while at the same time ensuring linearity when multiple photosensitive elements are used. In particular, the impedance of the active resonator structure at or around modulation frequency is chosen to be in the range of or preferably higher than an input impedance the amplifier connected in parallel. In an impedance bridging configuration, the impedance of the active resonator structure at or around modulation frequency is chosen higher than an output impedance of the photosensitive element.

As already mentioned above, a laser receiver with a long measurement range is desired. Longer measurement ranges require long receiver windows and sensors, as the leveling beam diverges proportional with the range/distance to the laser-beam emitter. Extending the measurement range by choosing longer sensor elements like long BiCells or PSDs has the drawbacks of increased sensor capacitance and higher backlight generated current, which can be considered as undesired noise and which is blanketing the signal to be actually measured or even clipping the signal in case of sensor saturation. Increasing the bias voltage of the sensor elements is the state of the art method to increase the backlight level at which saturation occurs, however at the expense of power consumption. Furthermore there is a physical limit for the bias voltage of the sensor element, which also limits the maximum active sensor area (and therefore length) of the sensor element where sufficient backlight suppression is achievable.

Apparently, the method and circuit presented herein can also improve signal evaluation without enlarging the sensor area e.g. to allow reduced transmission power, increased detection range and/or increased positional accuracy in a state of the art receiver by incorporating an active resonator structure according to the present invention.

According to another aspect of the present invention, the length of the laser receiver's receiving window for position determination can be extended beyond the maximum physical length of the contributing sensor elements through a serial concatenation of multiple sensor elements.

Single PSDs for light position determination are well known, but are not per se applicable for worksite laser leveling, especially due to their limited size and the saturation effects as explained above. The arrangement of multiple sensors is not equal to a simple elongation of the sensor length by a subsequent arrangement of multiple sensors.

An ideal light beam position detector for leveling requires an accurate position determination of a wide range of light beam diameters with sufficient sensitivity and backlight suppression. The beam diameters at the receiver can therein even exceed the length of a single sensor element of a series arrangement, in particular for covering a wide range of distances in leveling applications.

A straight forward series arrangement of multiple sensors would also still suffer from the same saturation effects as one long sensor, whereby no advantage would be gained.

Preferably, the accuracy of position determination has to be in the millimeter range or below, wherein also linearity of the position readout is an important aspect. The prior art readout and backlight suppression circuitries would—due to their load impedances—cause nonlinearities and signal damping, which would be beyond a useful level and would disrupt linearity required for accurate level determination. In particular in a series arrangement of sensors, a taping of each sensor output by prior art circuitries is not applicable, as their load impedance would reduce signal strength and/or disrupt linearity.

A skilled person would therefore expect that a series arrangement of sensors would not lead to any obvious advantages, in particular would not be suitable for laser leveling, wherefore he would not consider applying it. That is also one reason why e.g. PSDs are not used in prior art, although PSD devices have been known and were available for a long time.

A combination of a series arrangement of multiple sensors with a suitable resonator at each terminal, as one embodiment of the present invention, gains additional advantages in backlight suppression and maintaining linearity. Also, the further additional aspect of a switched sensor readout arrangement dedicated for far or near distances, according to another sub-aspect of the present invention, helps to furthermore achieve longer light position sensors for a wide range of beam diameters with advanced detectability and position accuracy.

As a further aspect of the present invention, the light beam position detector can also comprise a readout circuitry with a variable, in particular alterable, readout interconnection of multiple photosensitive elements. The readout circuitry can thereby be used to configure the beam position detector into at least two modes with a different positional weighting of the light beam position within the detection window by a variation of the readout circuitry, in particular by variation of the interconnections of the outputs of the PSDs and/or adjustment of the load impedances applied to the PSDs outputs.

The present invention can be used to achieve a simple and cost efficient laser position sensing device which allows a long receiver window by comprising an advantageous setup and electronic signal evaluation circuitry to overcome the above mentioned disadvantages like saturation, nonlinearity and/or low sensitivity.

The presented circuitry, is in particular advantageous when using position sensitive devices PSDs based on the lateral photoelectric effect, for the linear detection of the laser beam position on the receiver. The proposed circuitry and signal processing method is however not limited to the use of PSD sensors. In particular the alterable interconnection combined with the backlight suppression by an active resonator filtering circuitry according to the present invention can also be advantageously used with BiCells, photodiodes or other photoelectric elements as sensors.

As already mentioned above, the invention also relates to a method for evaluating a light spot in a backlight condition by a photosensitive element. Particularly, a position of the light spot is to be determined within a detection window comprising the photosensitive element.

Therein, the light spot is applied to the active surface of the photosensitive element in such a way to achieve a modulated light intensity on the photosensitive element. Dependent on the light intensity and on the backlight condition, at least one electrical signal is generated. This electrical signal is evaluated so as to determine the position of the light spot on the photosensitive element. Therefore, the electrical signal can be amplified with a high input impedance amplifier and subsequently converted from analog to digital.

According to the invention, before evaluating the signal, a low frequency part of the electrical signal resulting from backlight is actively drained by an active resonator structure having a low impedance for low frequencies, in particular from zero to double of mains frequency, for avoiding backlight saturation of the photoelectric element.

On the other hand, a high impedance at modulation frequency (or modulation frequencies) is used for maintaining a level of a modulation frequency part of the electrical signal (i.e. that part of the electrical signal being at the modulation frequency or—if appropriate—at the modulation frequencies) for the evaluation.

In the following the various aspects of the present invention are described for an exemplary laser receiver using PSD sensors, not excluding alternative sensor means with similar characteristics and/or similar drawbacks which can also be overcome according to the teachings of the present invention.

BRIEF DESCRIPTION OF THE DRAWINGS

The method according to the invention and the devices and system according to the invention are described or explained in more detail below, purely by way of example, with reference to working examples shown schematically in the drawings. Specifically.

The diagrams of the figures should not be considered as being drawn to scale.

DETAILED DESCRIPTION

It's a desire to improve the signal to noise ratio, especially when increasing sensor sizes in light receivers, in particular for leveling applications where e.g. distance and coverable height benefits. In the detection of a light spot in a large photosensitive element, backlights can be problematic as they induce electrons in the photosensitive elements which are independent from the light spot to be measured and can therefore be considered as undesired "noise". Another important issue is that photosensitive elements suffer from saturation. When the induced photo-electrons are not drained fast enough, they accumulate in the photosensitive element—the element saturates.

This can be overcome by blocking out sunlight and other disturbances, like swiveling lights and undesired strobe lights, whereby the detectability of the actually desired signal can be increased. This e.g. helps to overcome the saturation effects of a long PSD. Even if the long PSD is formed by a series arrangement of shorter PSDs, it would—without further precautions—suffer from the same saturation effects as one long PSD. A removal or reduction of saturation as explained below can overcome or at least reduce this effect, in particular in a series arrangement allows a saturation-draining at each tap of the serial connection, whereby further improvements compared to a usage of one long sensor can be achieved. But not only PSDs but also Photodiodes, in particular arranged as BiCell for position detection, suffer from the saturation issue.

Strong sunlight falling onto the photosensitive element generates many electrons. These electrons saturate the sensor if they are not drained away effectively. PSD manufacturers therefore recommend to electronically influence the amount of sunlight that the sensor is able to cope with by increasing the bias voltage and by reducing the load resistance of the sensor. Also narrow optical filters, which can only be passed by the wavelength desired to be received, can be placed in front of the sensor to reduce the intensity of undesired wavelengths which would otherwise contribute to saturation but not to signal. In particular as many backlight sources are optically broad banded (especially sunlight) and also as practical filters are imperfect, there is still a remaining amount of background light present at the sensor.

So, to leak away sufficient electrons generated by strong sunlight, a low load resistance connected to the high impedance output of the sensor is beneficial. However, the load resistance also affects the signal amplitude of the laser pulse striking the sensor and also decreases the linearity of the sensor, whereby those two aspects are contradictory.

Figure 1A:
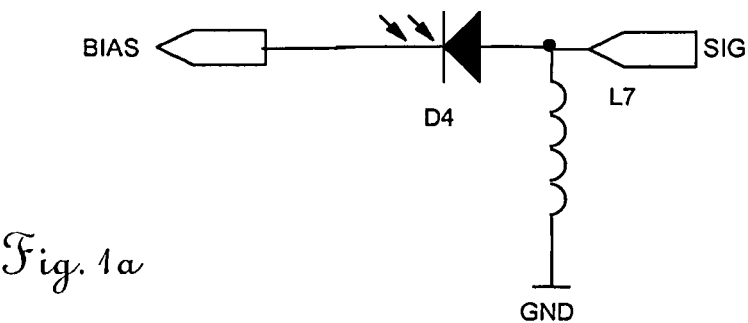
FIG. 1a shows a passive circuitry as known in prior art.

The common method to increase the signal strength at the evaluated output port SIG and to suppress the sunlight induced saturation in prior art is to use an inductor L7 in parallel to the sensor D4, as illustrated in FIG. 1a. For example, the documents U.S. Pat. No. 7,012,237, U.S. Pat. No. 5,886,776 and U.S. Pat. No. 4,756,617 mention this approach. The BIAS-port scan also be used to achieve a certain suppression, as known in the art.

Therein the impedance Z of the inductor L7 is $$Z = j\omega L,$$

with $\omega$: frequency and L: inductance.

The achievable impedance is limited by the physical realization of the inductor L7 which is affected by the series resistance of the inductor combined with the capacitance of the wires aligned in parallel.

An exemplary duration of the laser pulse $\Delta t$ in a rotational laser leveling application is given by $$\Delta t = \frac{\text{Laser Spot Size}}{2\pi \cdot D \cdot f},$$

with: D=Distance between laser rotator and sensor and
f=rotating frequency of the laser rotator.

Assuming a distance of 100 m, a laser spot size of 25 mm and a rotating frequency of 10 Hz, the duration of the laser pulse is $$\Delta t = \frac{25}{2\pi \cdot 100000 \cdot 10} = 4 \, \mu s.$$

Combined with the width of the sensor, the rise time of the sensor and the bandwidth of the transimpedance amplifier, the resulting total pulse duration observed on an oscilloscope is approx 25 µs. This results in a frequency response of at least 20 kHz. The impedance of an ideal inductor (50 mH) at this frequency response is 6 k Ohm, which is in a range where the readout linearity and/or sensitivity of the sensor are already perceptibly influenced by this impedance.

Figure 1B:
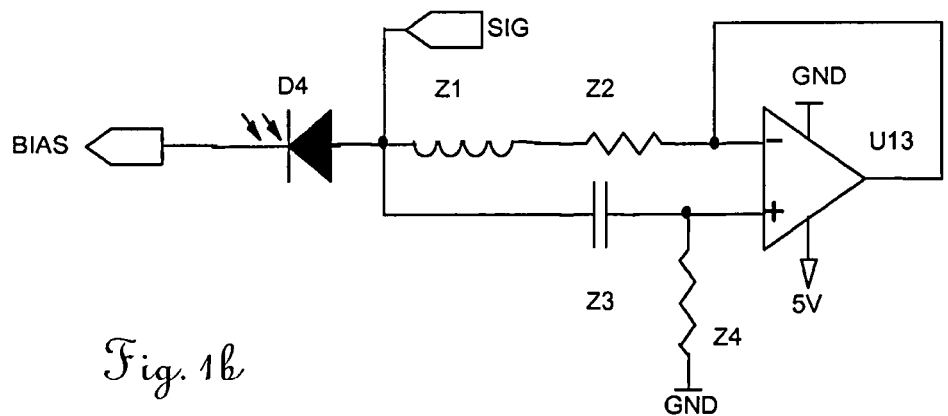
FIG. 1b shows a first exemplary embodiment of an active circuitry according to the present invention.

An improved structure to suppress the backlight saturation according to the present invention is shown in FIG. 1b and explained below.

This structure represents an active resonator or active reactance, whose resonance can be adjusted by changing the impedance of the constructing components. The sensor D4—illustrated as a photodiode (representative for a semiconductor junction)—is drained by a low load impedance of the active circuitry at low frequencies, while the active circuitry has high impedance at the signal frequencies of interest, allowing a high sensitivity and linearity of the sensor readout at the SIG terminal.

The exemplarily shown circuitry of FIG. 1b comprises an inductor Z1 and a series resistance Z2 (which can also be embodied by the inherent series resistance of the inductor) and a capacity Z3 and Resistor Z4, connected to the operational amplifier U13 as shown. Therein, Z4 can be embodied as a high impedance resistor, for example in a range of about 100 kOhm to several mega Ohm. As illustrated in detail below, the circuitry has a frequency response as impedance over frequency characteristic with a low impedance at low frequencies (e.g. suppressing more or less constant sunlight or 100/120 Hz from artificial mains-driven lights), a very high impedance at the frequency at which the leveling light is received (the actual signal of interest, e.g. 20 kHz), and a falling impedance at frequencies above (e.g. for noise suppression). The most important aspect in the present application is the lowpass characteristic for draining electrons to avoid saturation by background light. Nevertheless, strictly speaking, the circuitry in fact results in a kind of (asymmetric) bandpass filtering by its low impedance DC-draining characteristics, which is applied directly at the output of the light receiving element, in particular before the signal evaluation comprising a first amplification and/or signal filtering stage, and with a high impedance center frequency, preferably tuned to the frequency of the received laser light's amplitude modulation (due to intensity modulation or beam rotation). As explained below, the circuitry is also tunable by adjustable or switchable electrical components to modify the frequency response in impedance and/or center frequency as illustrated in one of the following figures. A skilled person in operational amplifier circuitries is aware of the fact that there are also other equivalent component arrangements possible, resulting in the same or similar load characteristics and frequency responses. Also embodiments of higher order or additional HF-suppressions are known in the art. The present embodiment illustrates the underlying principle of an active resonator and in particular considers the aspect of preferably low material costs of the components used.

An adjustment of the parameters of the active resonator is even possible online, e.g. by electronic potentiometers, transistors, switchable components in the circuit etc. Thereby a tuning of the circuit to achieve optimized sensing characteristics for the actual operating condition can be achieved. Also positional linearity can be improved by adjusting the circuitry accordingly, which is possible in this circuitry in a wide range of values and parameters.

The impedance of the resonator structure shown in FIG. 1b is given by:

$$Z_{in} = \frac{(Z_3 + Z_4) \cdot (Z_1 + Z_2)}{Z_1 + Z_2 + Z_3}.$$

When using the following components:

$Z_1 = j\omega L$, $Z_2 = R2$, $Z_3 = 1/j\omega C$, $Z_4 = R4$, the impedance of the resonator is:

$$Z_{in} = \frac{(1 + j\omega CR4) \cdot (R2 + j\omega L)}{1 - \omega^2 LC + j\omega R2C}.$$

A discussion of this formula reveals the following:
At $\omega = 0$:

$Z_{in} = R$.

For good sunlight and DC suppression $R_2$ will be chosen to be low, e.g. $R_2 = 100$ Ohm.
With $$\omega = \frac{1}{\sqrt{L \cdot C}},$$

with typically L=50 mH, C=1 nF $\omega = 140 \cdot 10^3$, and with a frequency f≈20 kHz and $R_4$=1 MegaOhm, the impedance results to:

$$Z_{in} = R_4 + \frac{L}{R_2 C} + j\sqrt{\frac{L}{C} \frac{R_4}{R_2}}$$

$|Z_{in}| = 70 \cdot 10^6$ Ohm

At $\omega = 1/R_2 C$, with $R_4 >> R_2$ and $R_2^2 \cdot C << 1$:

$Z_{in} \approx R_4 = 1 \cdot 10^6$ Ohm

At $\omega = \infty$, $Z_{in} \approx R_4 = 1 \cdot 10^6$ Ohm

The resonator structure shown in FIG. 1b offers several advantages compared to the impedance of the circuitry shown in FIG. 1a:

a. Significantly higher impedance at middle frequencies (20 kHz in the illustrative example). For example, approximately $5 \cdot 10^3$ Ohm for the passive inductor vs. approximately $70 \cdot 10^6$ Ohm for the resonator structure. This results in much stronger electrical signal pulses at far distances, whereby a better detectability is achieved.

b. Maintaining a very low impedance at low frequencies (<1 kHz) and thus providing an excellent suppression against other external noise sources like neon lights, swivel lights and strobe lights, resulting in improved robustness. An additional strobe light suppression circuitry, as e.g. described in U.S. Pat. No. 7,372,011, is therefore not required.

c. Ability to control the response curve by changing resistors and capacitors without great effort.

d. Ability to use low quality inductors with a high series resistance whereby low cost parts can be used for implementing the resonator.

e. When concatenating multiple PSD sensor elements in series, the high impedance of the resonator structure results in a highly linear detector. For symmetry of evaluation-load and linearity, each of the signal terminals of one or more photosensitive elements can be equipped with the resonator structure.

Figure 2A:
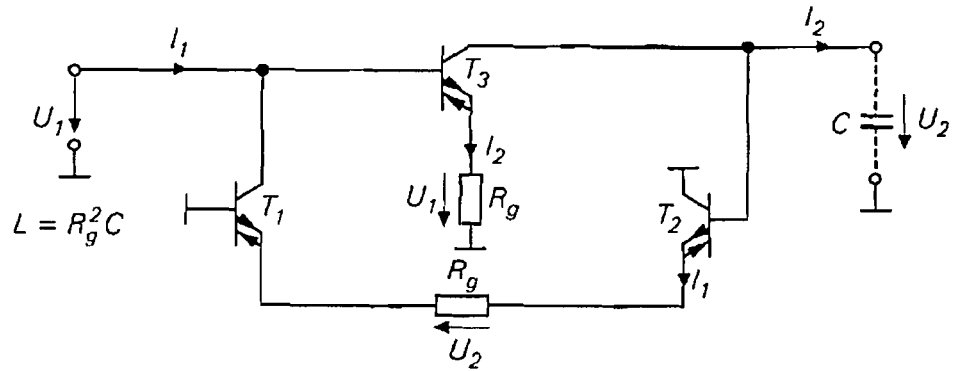
FIG. 2a shows a second exemplary embodiment of an active resonator structure according to the present invention.

FIG. 2a illustrates a schematic sketch of the functional principle of the circuitry in a more abstracted way, which e.g. can be found in the book "electronic circuits" by Tietze/Schenk—therein referred to as gyrator circuit—for realizing inductors without a physical inductive component. At the input U1 to be connected to the photosensitive element, the circuitry's inductive characteristic can be described by $L = R^2 \cdot C$—providing a virtual inductance which's inductance can be designed in a wide range and which achieve values beyond the ones achievable by discrete coil-type inductors, due to the usage of the active elements, in this case embodied by T1, T2, T3.

The known and mentioned implementation of the shown circuit is in cases, where an avoidance of inductors on a circuit board is desirable, e.g. because of EMI-effects as passive inductors tend to both receive and transmit electromagnetic fields. Also the assembly line processing of capacitors, available in SMD-packages in a wide range of values, is often more desirable than having to handle inductors with wire-windings, having bulky cores, requiring special solder techniques, being more expensive, etc.

The active resonator which bases on a so called Gyrator-Circuit behaves like an almost "ideal inductor" in a certain frequency range. The circuit can achieve high inductivity-values which can not be realized by passive inductor (or if, only by coils with many windings, highly specialized core materials, etc. which makes them bulky and expensive).

A skilled person is aware of drawbacks of a virtual impedance of a gyrator. One of the major drawbacks is the limited frequency range in which it shows inductive behavior. Also the Q-factors achievable might not be satisfactory for certain applications. The circuit design as presented in FIG. 1b or FIG. 2b also results in an inductance which is always grounded on one side (although there are more complex circuit designs known which avoid this drawback).

In the certain application of evaluating a light beam position, in particular of a rotated—and thereby intensity modulated received—laser beam, on a photosensitive element under natural or artificial backlight conditions, the circuit can be designed in such a way to make the above mentioned drawbacks acceptable. A suppression of high frequency light or noise signals above the modulation frequency can even be seen advantageous for the overall signal-to-noise ratio, as it also helps suppressing HF-noise. The Q-factor of the impedance is not a mayor issue in draining backlight effects, and also a draining of the electrons to ground-potential can be seen as a desirable suppression technique.

An avoiding of inductors is not the main goal of the present suppression circuitry, as it is in classical applications of a synthetic reactor circuitry. Therefore, the circuit according to the present invention can also comprise passive inductors as e.g. in FIG. 2a, in particular for further advancing suppression characteristics, increase circuit-stability, etc. Nevertheless, the passive inductors used in the active inductance do not require such sophisticated parameter values to achieve the desired suppression characteristic as they would in a passive design. This allows the usage of cheap standard electronic components. Also their frequency characteristic is much more customizable the exact applications need, in particular without great effort.

Due to the high source impedance of photo detectors like photodiodes or PSDs, the signal evaluation can preferably comprise a transimpedance amplifier. There are also dedicated chips available which are dedicated for the readout of those photosensitive elements.

In comparison to state of the art low pass filtering approaches, which are done after the transimpedance amplifier, the present circuitry is capable of actively draining photo-generated electrons resulting from backlight, which would otherwise saturate the semiconductor and thereby also hinder the detection of the electrons generated by the modulated light spot to be evaluated.

A suppression ratio of the circuit can be defined as impedance at modulation frequency divided by impedance at DC-level. As passive, inductors require a large number of windings to achieve high impedance—which results in high reactance at high frequency, also the DC-resistance of the inductor rises—which is required to be low for DC-suppression. Therefore the design of a passive inductor is always a tradeoff between those two values.

A synthetic reactor, in particular inductor, according to the present invention can be designed much more freely in both of the parameters, wherein limits are mainly marked by circuit stability and non ideal behavior of the components used.

The mentioned component values in this description should not be considered as limiting but merely as exemplary embodiments, giving a rough idea of the value-ranges to achieve the desired circuit behavior. An engineer skilled in the design of operational amplifiers circuits might also be aware of certain modifications and extensions to the basic circuitries shown in the figures when practically implementing the design in hardware.

Another aspect of the present invention is the fact that due to the improved method for backlight suppression according to the invention, the power requirements of the light beam transmitter can be reduced, resulting in lower power consumption, improved eye-safety, etc. without accuracy or functionality drawbacks, in particular due to the improved signal-to-noise ratio achievable according to the present invention.

A further aspect or usage of the method of backlight suppression is an increased range of a laser leveling system comprising a laser plane transmitter and a laser receiver with an active backlight suppression circuitry according to the present invention. By increased backlight and disturbance suppression by the active resonator and the thereby consequently improved signal-to-noise ratio, the receiver is operable in an increased distance range from the same transmitter than a prior art device. In particular in the guidance of work-site machinery such as in road building or terrain shaping this can bring advantages, especially as such work is preferably carried out in bright sunlight conditions. The range increase can be even more extended, if a multiple photosensitive sensor element arrangement in a Butt-Cell configuration, according to a further aspect of the invention is used in the receiver.

Figure 2B:
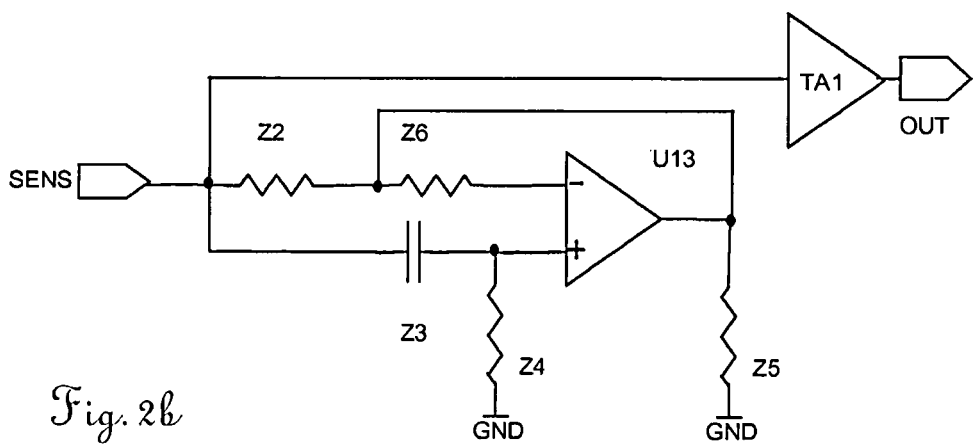
FIG. 2b shows a third exemplary embodiment of an active resonator circuitry according to the present invention.

Also FIG. 2b shows an exemplary variation of an embodiment of an active resonator circuitry for backlight suppression according to the present invention. Therein the additional components Z5 and Z6 are shown and the photosensitive element is represented by the input port SRC. Also connected in parallel to the photosensitive element's output port, in parallel to the active resonator, there is also an amplifier TA1 for signal evaluation shown. The amplifier is in particular of high input impedance, such as amplifiers often referred to as transimpedance-amplifiers.

Figure 3:
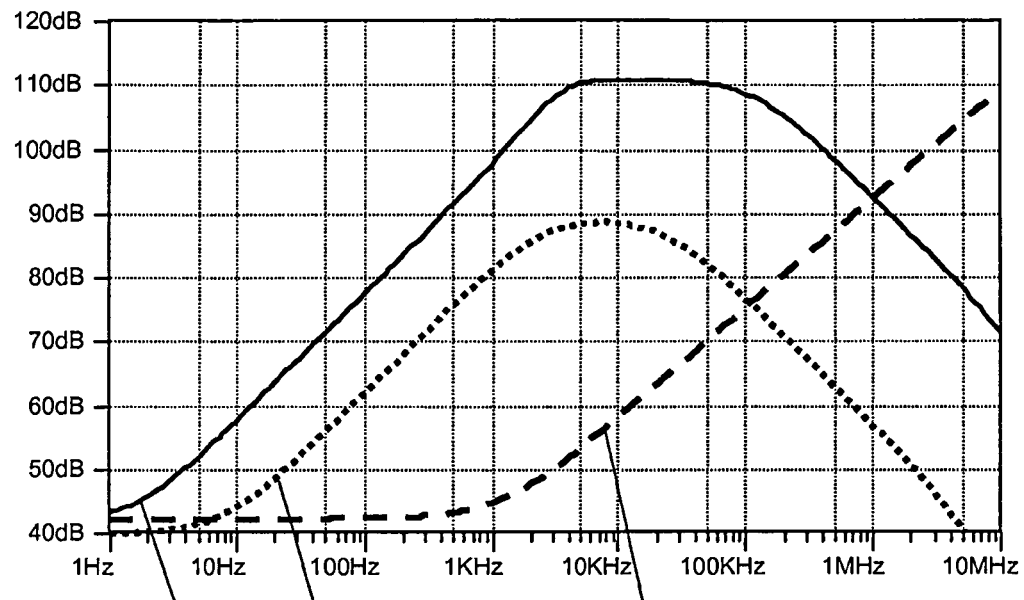
FIG. 3 shows a first diagram of exemplary frequency responses of a prior art passive inductor in comparison to responses of embodiments of the gyrator and the active resonator according to the present invention.
Figure 4:
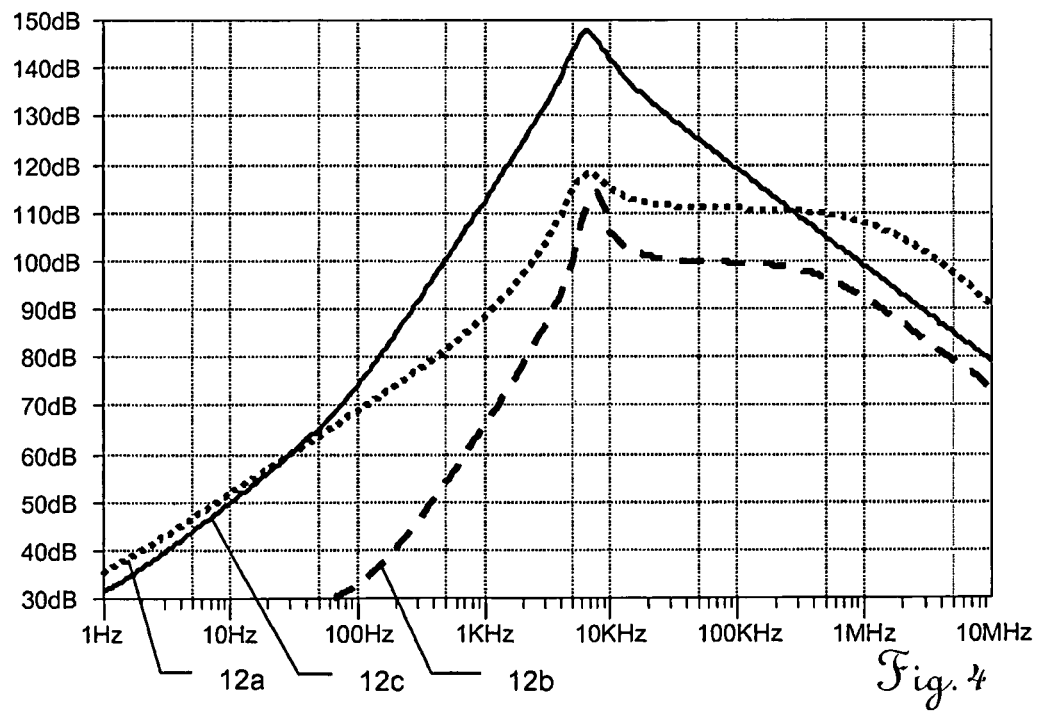
FIG. 4 shows a second exemplary frequency response of embodiments of the active resonator according to the present invention.

FIG. 3 and FIG. 4 shows exemplary frequency responses 11b, 11c, 12a, 12b, 12c of the impedance of an active resonator circuitry which can be used for backlight suppression according to the invention. The exemplary embodiments of the circuits which are resulting those responses can be found in FIG. 11 and FIG. 12 with a corresponding numbering. The responses 11b and 11c shown in FIG. 3 are compared to a prior art suppression circuit response 11a. The responses according to the invention are showing a bandpass-characteristic with a center frequency at about 20 kHz which is well suited for a backlight suppression for a laser beam received with the same frequency. Thereby the lower frequency backlight as well as higher frequency noise is attenuated by the circuit. According to the invention the suppression rate is significantly higher than in prior art. The circuit according to the invention can be designed to match the frequency of the received signal or it can even have an adjustable Frequency response, as explained above.

In FIG. 4 the shown characteristics achieves an even higher suppression rate. The responses 12a and 12b are shaped more to a low pass characteristic with a narrower, slightly shifted center frequency of about 8 kHz, an increased low frequency attenuation and less suppression in the higher frequency ranges. The response 12c provides the least drain (=highest impedance) shown, with 140 dB at 10 kHz compared to approx. 60 dB of the prior art passive suppression circuitry as shown in FIG. 3. The response 12b provides the best drain of DC to mains-driven artificial illumination of 100 Hz or 120 Hz of 30 dB compared to more than 40 dB of the passive circuitry shown in FIG. 3. Simultaneously, the response 12b provides 100 dB of impedance in the frequency range of 5 kHz to 100 kHz compared to the 55 dB to 75 dB over the same frequency range, which could be achieved with the passive circuitry shown in the response 11a in FIG. 3.

According to the invention, multiple frequency responses can be achieved by the same circuitry in a quite simple manner, if the circuit comprises adjustable electrical components. An adjustment of the characteristics can be achieved quite simply by variable or switchable resistors. A value adjustment of a prior art passive inductor on a circuit board would be much more complicated. Thereby, the receiver can be adjusted to different transmission frequencies or environmental conditions, e.g. also to compensate for temperature drifts of the receiver and/or transmitter, etc. The required adjustments can be detected and executed automatically by an evaluating microprocessor or they can be selected manually by an operator.

Figure 5:
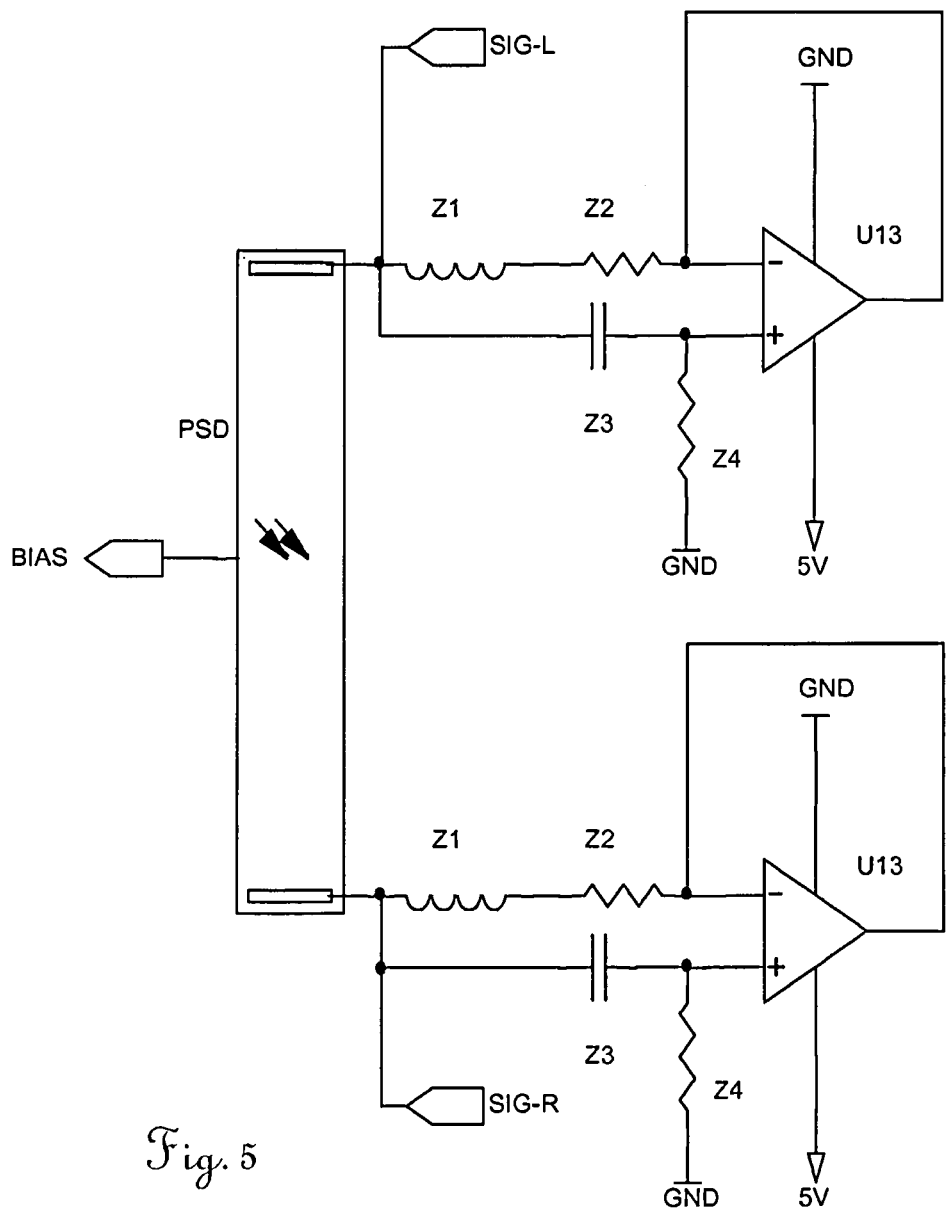
FIG. 5 illustrates an exemplary embodiment of a PSD-element taped by readout circuits according to the present invention.

FIG. 5. illustrates an example of an embodiment of the suppression circuit according to the invention on a PSD for detecting the position of the center of an intensity modulated light beam on the PSDs active surface in the presence of backlight disturbances. The active resonator circuit is therein connected in parallel to each of the PSDs readout connections SIG-L and SIG-R which can be connected to a (not shown) transimpedance amplifier followed by an (not shown) analog to digital conversion for further digital processing of the signals and evaluation of the beams position. The low impedance at DC (sunlight) or twice mains frequency (artificial light) as well as at high frequency (high frequency modulated light, noise, etc.) which is provided to the PSDs or Photodiodes output by the resonator, drains the electrons of those frequency ranges to ground. At the frequency of light modulation, the suppression circuit provides a much higher impedance to the output, wherefore this part of the signal is not drained by the active resonator but can be evaluated, e.g. by a transimpedance amplifier connected to the output at SIG-L and/or SIG-R. The active resonator can be designed in such a way to provide an impedance higher or in the range of the input impedance of the transimpedance amplifier, wherefore loss of the signal to be evaluated can be minimized. Also an adoption of the impedance at modulation frequency by an adjustable component in the active resonator can be used to accommodate to the intensity of the modulated light received by the PSD. For example by keeping the signal amplitude in a certain range by, in particular online, adjustment of components influencing the resonators impedance—independent of the intensity of the actually received light, the required dynamic range of the following evaluation circuitry can be reduced without severe measurement performance losses, still covering a wide range of received light beam intensity. This can for example also allow omitting an adjustable BIAS or may even any bias at all to be supplied to the photosensitive element.

Figure 6:
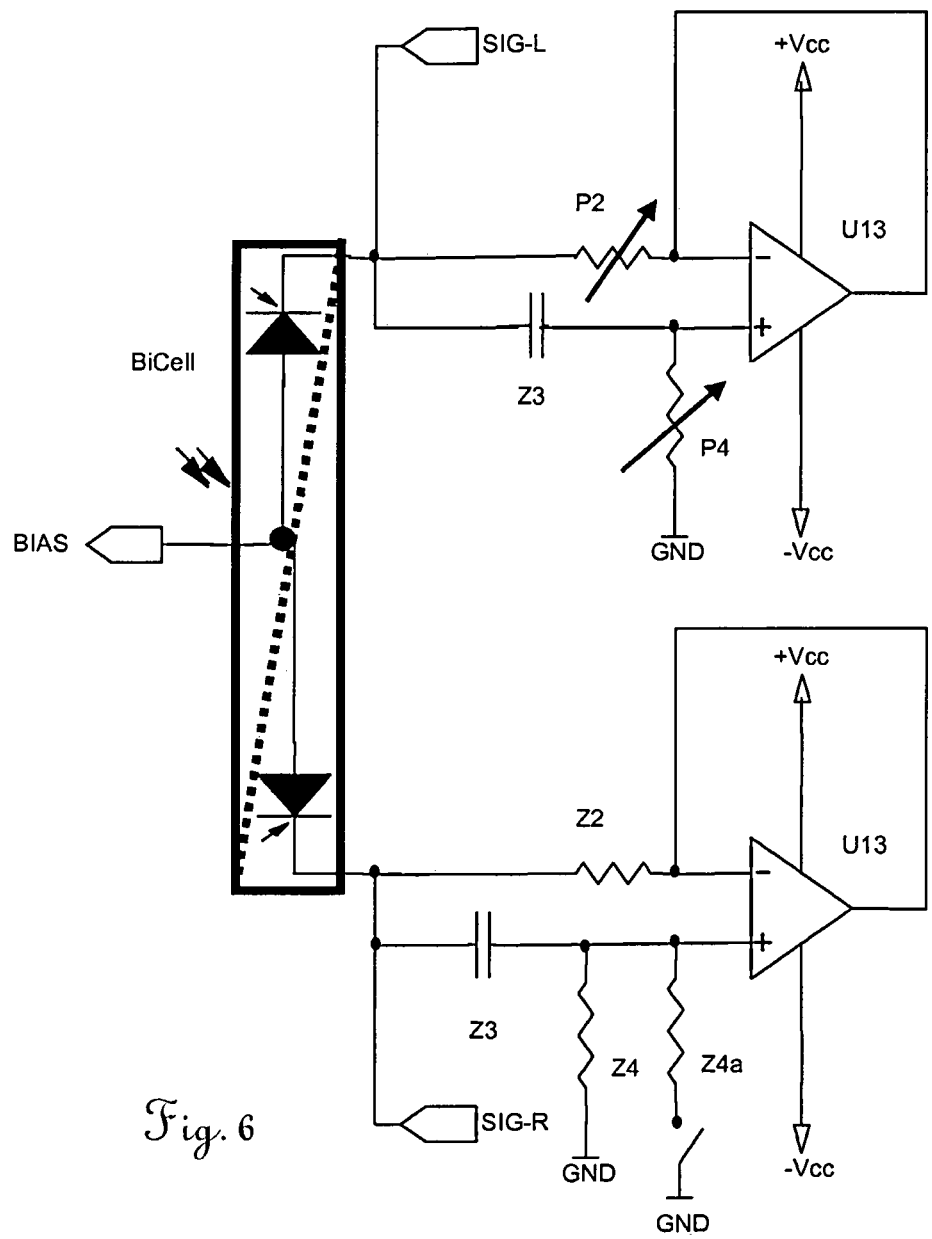
FIG. 6 illustrates an exemplary embodiment of a BiCell with readout circuits according to the present invention with an adjustable frequency, response.

FIG. 6 illustrates a detector with two photodiodes aligned a BiCell arrangement. The two suppression circuitries show two exemplary embodiments of adjustable components—variable resistors P4, P2 (e.g. as potentiometers, digital potentiometers, . . . ) and resistor Z4a with corresponding switch (e.g. transistors, switchable resistor networks, etc.). Those examples allow varying the circuit's characteristics, in particular by a frequency-shift or attenuation adoption at low frequency and/or modulation frequency. Also the capacitive component could be made adjustable, although adjustable resistors are more commonly used than adjustable capacitors.

When a narrow light beam 2 is applied to two sensors 1, the beam e.g. a laser beam, has a sharp spot characteristic on the device. This is a typical example of a laser spot in a leveling application at close distances, where the position of the optical axis of the laser as center of gravity of the spot's intensity on the sensor needs to be determined. At close distances, typically a small laser beam 2 falls on a larger sensor and the sensor 1 can discern the center point of gravity of the whole laser beam very well.

The light intensity distribution over the sensor area is typically not as narrow in a far distance leveling application, where the laser beam's divergence has broadened the laser beam to an intensity distribution as illustrated by the intensity profile of the beam 2. As at far distances, the laser beam 2 can even be taller then the sensor 1, the intensity distribution within the laser beam which has to be determined for beam position measurement, is more difficult to detect.

In case the laser beam 2 is larger than the sensor 1, the sensor needs to determine the center point of gravity without seeing the whole beam. In particular, if the beam 2 has an even intensity distribution, it is impossible to determine the center of the beam 2 with some degree of accuracy. Therefore also long receiver windows are required to preferably cover the whole beam.

The intensity distribution of the laser beam 2 at far distance can been modelled with a parabolic intensity distribution over the beam diameter. At the edge of the beam, the intensity is assumed to have dropped 50% compared to the intensity in the center of the beam.

Using this model, the centering performance of possible sensor concepts can be evaluated according to the following formulas:

A single PSD 1 with a weighing function is resulting in signals according to:

$$S_r = \int_0^L (1 - ax^2) \cdot \left(\frac{x}{L}\right) dx$$

$$S_l = \int_0^L (1 - ax^2) \cdot \left(\frac{L-x}{L}\right) dx$$

Figure 8:
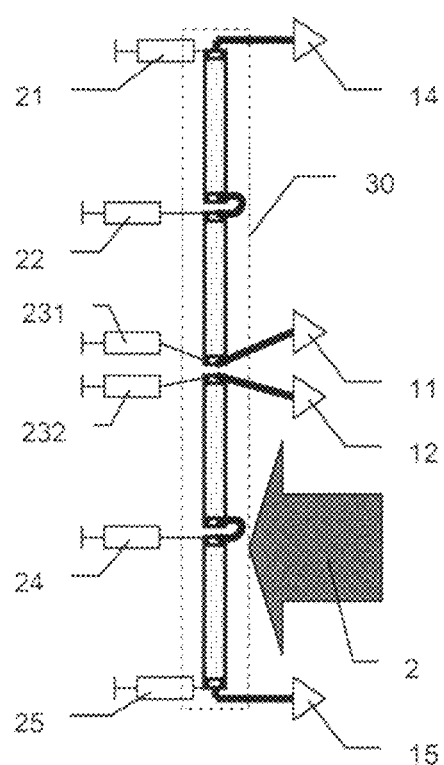
FIG. 8 shows an exemplary embodiment of a light position detection unit comprising multiple PSDs interfaced according to the present invention and configured for far distance mode readout.

With
L=Length of the PSD
C=Position of the center of the PSD, relative to the center of the beam $$a = p \cdot \left(\frac{2}{\Phi}\right)^2,$$

a factor describing the intensity profile of the laser beam
p=power drop at the edge of the laser beam
Φ=beam spot diameter
$S_r$=signal at the right hand side 11 of the PSD/Photodiode
$S_l$=signal at the left hand side 12 of the PSD/Photodiode FIG. 8 shows four PSDs in Butt-Cell arrangement with weighing of the signal in opposite directions over the series arrangement of the PSDs 1.

$$S_r = \int_{C-\frac{L}{2}}^{C+\frac{L}{2}} (1 - ax^2) \cdot \left(-\frac{x}{L} + \frac{C+\frac{L}{2}}{L}\right) dx$$

$$S_l = \int_{C-\frac{L}{2}}^{C+\frac{L}{2}} (1 - ax^2) \cdot \left(\frac{x}{L} - \frac{C+\frac{L}{2}}{L}\right) dx$$

Using this model, the centering sensitivity of a Butt-Cell arrangement of two PSDs is 50% higher compared to a same arrangement using Photo Diodes.

Nevertheless, there are also shortcomings of the Butt-Cell arrangement in certain constellations, which can be overcome according to additional aspects of the present invention for achieving a wider applicability.

Figure 7:
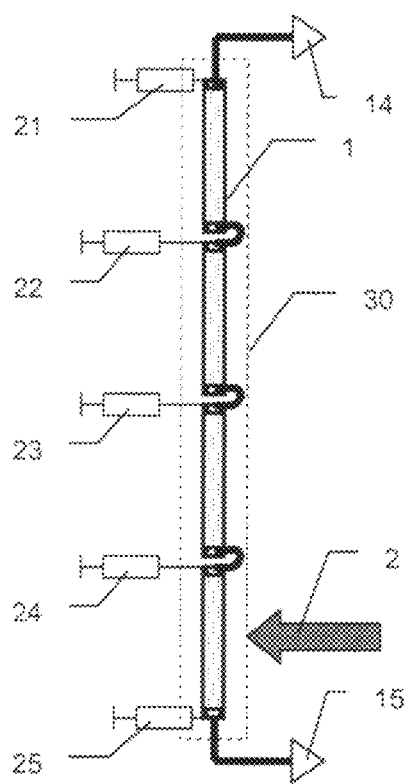
FIG. 7 shows an exemplary embodiment of a light position detection unit comprising multiple PSDs interfaced according to the present invention and configured for near distance mode readout.

The Butt Cell arrangement of PSDs results in spot size dependence at close distance. This can be overcome—according to the additional aspect of the invention—by switching the PSD sensor arrangements from Butt-Cell as shown in FIG. 8 to a concatenated linear sensor arrangement (sensors connected in series) at close distances, as shown in FIG. 7. By switching the interconnections of the two PSDs into a series connection, an ideal, long, singular PSD is formed, if not for the small gap between the sensors. A smaller gap between the PSDs results in better linearity of the device.

FIG. 7 illustrates an exemplary embodiment of a light position sensor evaluated according to the present invention in a readout configuration for near distances with a small light spot diameter and backlight suppression.

The laser beam 2 impinges on the last sensor element 1 in the row of the receiver's detection window 30, the impedance at the bottom signal amplifier 15 which is in parallel to the bottom amplifier impedance, is the impedance 25. At least one of the impedances 21, 22, 23, 24, 25, 231, 232 in FIG. 7 and FIG. 8 is therein embodied by an active resonator circuit according to the present invention, in preferably all of the impedances comprise an active resonator for backlight suppression and/or load-impedance adjustment.

For the impedance 25 not to have a negative effect on the signal strength, the impedance 25 must be chosen greater than the impedance of the bottom signal amplifier 15. For symmetry, the impedance 21 is chosen equal to the impedance 25. The impedance—as seen from the position of the beam 2 in direction of the top amplifier 14, is the impedance 24 parallel to the impedance 23, parallel to the impedance 22, which is in parallel to the top amplifier 14 impedance. To avoid linearity distortions of the evaluated signal, the impedance 24 parallel to the impedances 23, 22 and 21 must be similar to the impedance 25 (25≈24//23//22//21). Therefore, the impedances 24, 23 and 22 are preferably greater than the impedance 21 (and 25). The mentioned amplifiers are preferably of high input impedance, in particular embodied as transimpedance amplifiers or integrated circuits dedicated for photo-element interfacing. The amplifiers outputs can be fed to an analog to digital conversion for further digital processing. Due to the active resonators attenuation of high frequency signal components, the requirements on an anti-aliasing-filter before analog to digital conversion can be reduced or the anti-aliasing-filter can be of low order or even be completely omitted.

The further above mentioned linearization requirement when concatenating multiple sensors can be fulfilled by choosing appropriate components in the active resonator structures according to the present invention. By using a series arrangement of PSD-elements, the draining of backlight saturation can be improved over the usage of one elongated element, as additional tapings by suppression circuitries at the interconnections of multiple photosensitive elements results in better suppression effects than taping only the ends of one long element.

For switching over to the embodiment of FIG. 8—showing a far distance configuration of the same sensor arrangement as in FIG. 7—, the previously present impedance 23 must be split into two structures with the impedances 231 and 232, which in parallel form the impedance 23. In addition two amplifiers 11 and 12 at the middle connectors, in parallel the impedances 231 and 232 respectively, are present.

A practical circuit for near and far distances can comprise both configurations FIG. 7 and FIG. 8 in a switchable manner. A decision whether a near or far beam is present can be made manually or dependent on the detected intensity distribution over the sensors. The taping and splitting of the But-Cell arrangement does not necessarily have to be done in the middle of the series arrangement, but can be at any one, some or all sensor interconnections, in particular if above impedance considerations are applied accordingly to maintain linearity. The adjustable characteristics of the impedances—embodied as active resonators according to the present invention—allows an easy switching between the two modes and suited impedances in both modes without great circuitry effort.

The reconfiguration of the readout circuitry changes the weighting method of a linear sensor arrangement to achieve a linear sensor at close distances with small narrow beams and a sensor with superior centering sensitivity at far distance with wide laser beams. By adjustments to the active resonator structures, the weighting method can be adjusted to an arbitrary polynomial.

For leveling receivers, which are used to align the center of the laser receiver to the optical axis of the received laser beam, a preferred embodiment of the split Butt-Cell readout configuration is a split point in the middle of the row in case of an even number of PSD sensors. For odd numbers of sensors, the readout circuitry can for example be embodied with two split, points, by evaluating the upper and lower receiver(s) in Butt-Cell configuration and use the central PSD either as an individual, single PSD or alternatively even skip the central PSD, resulting in a Butt-Cell configuration with a gap in the middle, in particular as in this readout configuration, the received beam diameter will larger than the length of a single PSD.

Figure 9:
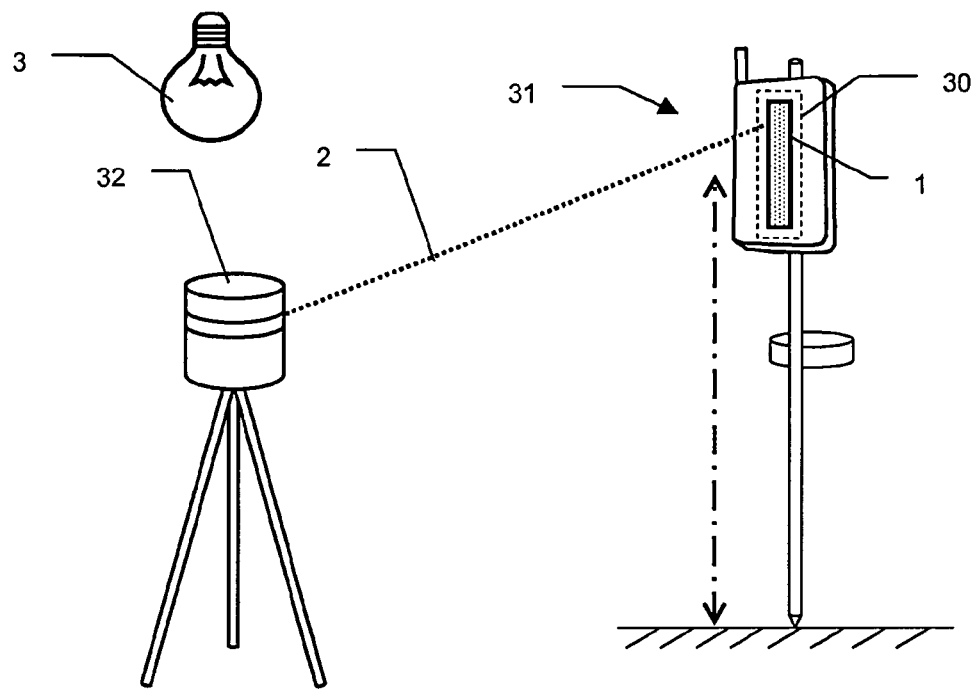
FIG. 9 shows a first example of a laser leveling application with a laser rotator and laser receiver with a light beam position detector comprising a circuit according to the present invention.

FIG. 9 shows a first exemplary leveling application with a laser receiver 31 according to the invention, which receives a laser beam 2 from a rotational laser 32. Alternatively, also an intensity modulated laser plane can be emitted by beam shaping optics without rotating a beam. The projected light-plane does not necessarily have to be flat but can also be curved or comprising edges. The receiver's detection window 30 comprises at least one photosensitive element 1, which is interfaced according to the present invention as explained above. The backlight 3 is symbolized by a light bulb, representative for artificial light. A typical example, for the illustrated application is concrete working, where a plane concrete surface has to be built, such as a building's ceiling or floor slab. In this example, the laser transmitter 32 and the laser receiver 31 are in general not as far apart that the divergence of the laser has broadened the projected laser spot at the receiver window 30. Due to the small spot size—according to one of the further aspects of the present invention—an electrical series connection of the PSDs is chosen.

Due to the high backlight suppression and linearity of the position determination according to the invention, an exact leveling can be achieved and also a measurement of the deviation from the desired level within the range of the long detection window—according to the present invention—can be made, e.g. to build tilted sections, steps or the like, say e.g. in an off-level-range of +/−10 cm or even more. As the mentioned concrete leveling is done outdoors in bright sunlight conditions (or at night under spotlights) the suppression of saturation of the PSD by those sources of constant or low frequency light is an aspect which is solved—according to the present invention—by the active resonator circuit used for suppression which can be used at some or all of the PSDs' electrical outputs and even improved—according to one of the further aspects of the present invention—by a splitting of the detection window into multiple PSDs with higher saturation thresholds. Apparently, the laser plane from the transmitter 32 can also be spanned in a tilted or upright position for applications other than leveling a plane, like drilling holes in a vertical line for fitting bolts to attach pipes or erecting steel structures.

Figure 10:
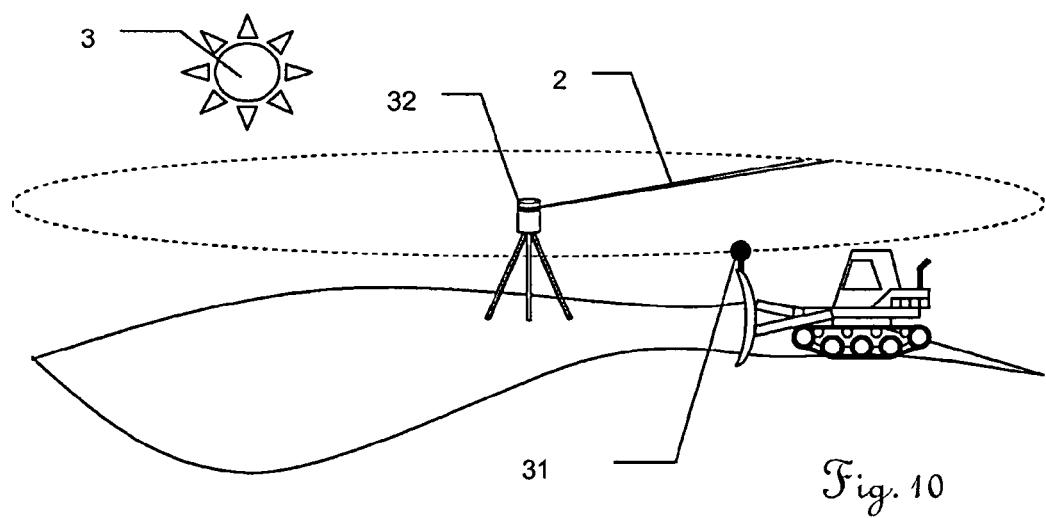
FIG. 10 shows a second example of an outdoor laser leveling application with a laser receiver with a light beam position detector comprising a circuit according to the present invention to avoid sunlight saturation effects.

FIG. 10 shows a second exemplary leveling application, wherein a laser rotator 32 is emitting a laser beam 2 spanning a leveling plane for the dozer 33 which is equipped with a laser receiver 31 with a detector according to the present invention. The backlight 3 is illustrated by a sun-symbol, representative for almost constant natural light. Due to the long distance between the emitter 32 and the receiver 31, the beam 2 has broadened, for example, to a width of 5 cm or 7 cm. To cover the full with of the beam for accurate leveling, the detection window has to be of at least that length to cover the whole beam. An electrical Butt-Cell arrangement of the sensors can be used to achieve high centering sensitivity for an exact leveling at far distances due to resulting positional weighting of the detector. Also the above mentioned saturation suppression according to the invention is applied in this application which helps overcome the signal losses of the broadening of the light beam relative to the backlight intensity.

A person skilled in the usage of the equipment referred to herein will be aware of many other application scenarios.

Figure 11A:
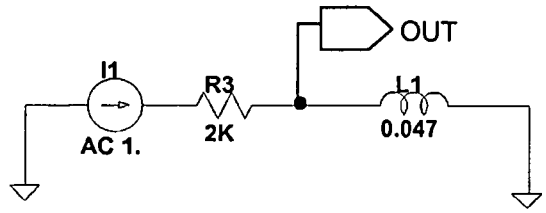
FIG. 11a shows a model of a prior art embodiment of a suppression circuitry resulting in the frequency response 11a in FIG. 3.

The circuit shown in FIG. 11a illustrates a prior art design wherein L1 is the passive suppression circuit and the receiving element is modeled by the alternating current source I1 and the series resistor R3. In the example used for the plot of FIG. 3, L1 has an inductance of 47 mH and a series resistance of 130 Ohm, which are reasonable real world values.

Figure 11B:
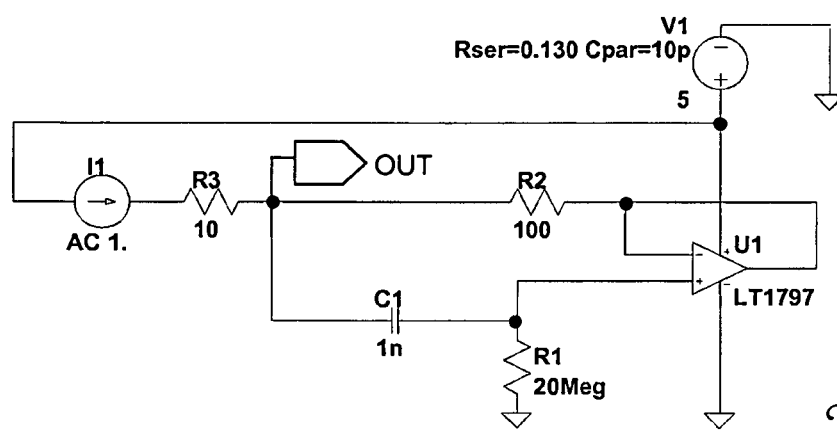
FIG. 11b/c show exemplary embodiments of active resonator circuitries according to the present invention, corresponding to the frequency responses 11b and 11c in FIG. 3.
Figure 11C:
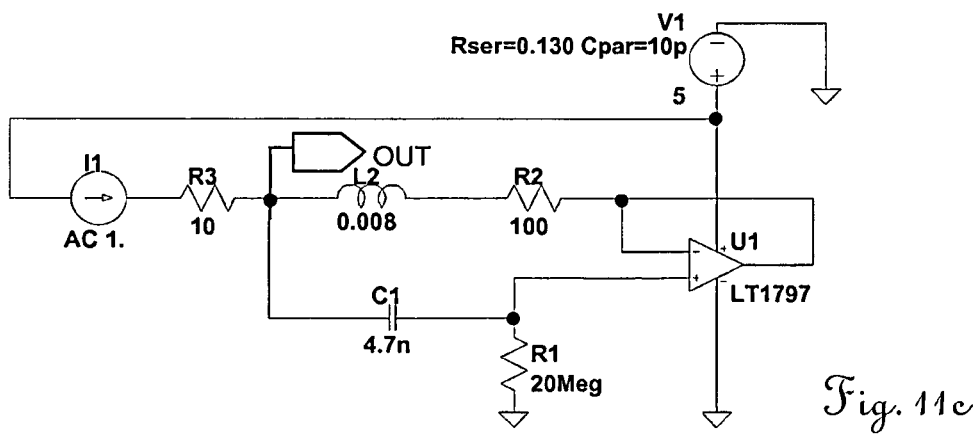

The circuits of FIG. 11b and FIG. 11c show embodiments of active resonator structures according to the present invention. As the circuit comprises an amplifier U1, in particular an operational amplifier or an equivalent transistor circuitry, it is called an active structure. FIG. 11b shows the basic design according to the invention, also referred to as gyrator circuit which is adapted to the present application's needs with an resonance at or in the range of the modulation frequency of the light to be received.

FIG. 11c shows an active resonator circuit according to the present invention which comprises an inductive component L2 in series to the resistor R2. The present application does not have the design goal of omitting inductive components as gyrators usually have. The inductance value of L2 can be designed lower than the one of L1 in FIG. 11a, in this embodiment only 8 mH, which allows reduced component size and price. Nevertheless the achievable suppression ratio is much higher then the one in prior art.

Figure 12A:
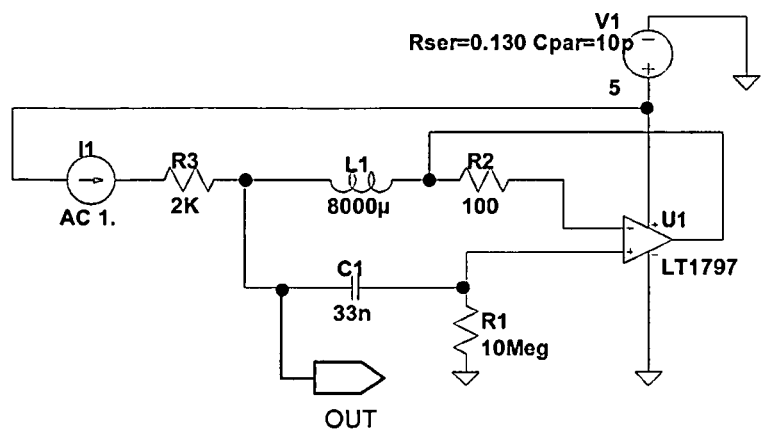
FIG. 12a-c show exemplary embodiments of active resonator circuitries according to the present invention corresponding to the frequency responses 12a, 12b and 12c in FIG. 4.

FIG. 12a shows an embodiment according to the present invention with a more sophisticated feedback circuitry of the active resonator. By this, the frequency response can be tuned even more to the desired high suppression rate of low frequencies compared to the desired signal frequency as shown by graph 12a in FIG. 4.

Figure 12B:
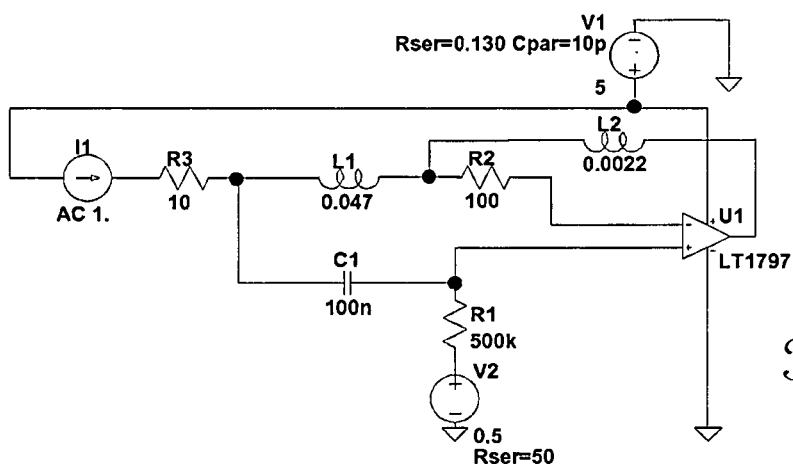

The embodiment of FIG. 12b shows another design according to the invention which provides a high suppression of frequencies up to about 100 Hz but with a slightly decreased suppression of frequencies abode the desired signal frequency.

Figure 12C:
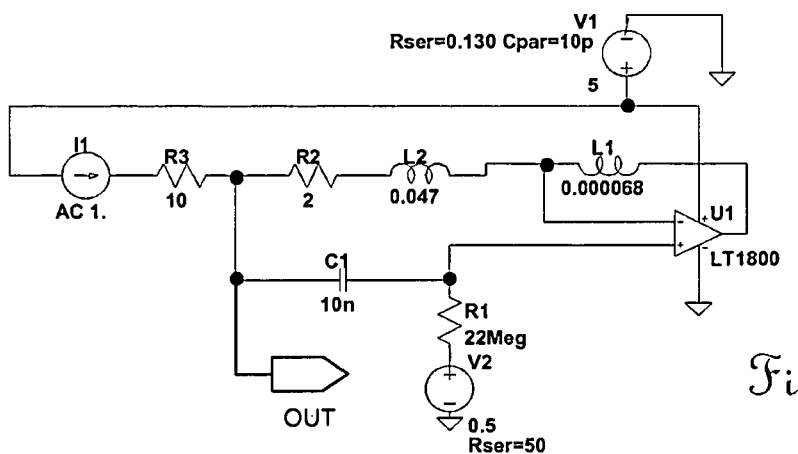

In the embodiment of FIG. 12c, the operational amplifier U1 has been substituted by another amplifier type with different characteristic values. On selecting an operational amplifier a low dc-impedance of the output and a sufficient draining power has to be considered, as the operational amplifiers absorbs most of the backlight's signal energy.

A person skilled in the art is aware of many more modifications to the concept of the active suppression circuitry according to the present invention. In particular a skilled electronic engineer is aware of further circuitry modifications and enhancements to the active resonator to further shape the frequency response to the products requirements and adding necessities like additional components for avoiding oscillations, parasitic resonances, etc.

In a further embodiment, which could also be seen as a standalone invention, the signal energy provided by the backlight can also not only be absorbed, but used to, at least partially, supply the receiver circuit with power. Therein the active component of the active resonator according to the invention is replaced by a power converter, preferably with low input resistance at DC for sufficient low frequency backlight draining. In case of a switching mode power converter also the switching frequency has to be chosen in a way to not disturb the desired measurement signal. The receiving element can e.g. be embodied as a Bi-Cell made of large area photodiodes, which are known as solar cells. Thereby the prior art problem of sunlight saturation can be turned into an advantage, in particular with the advantage of increased sensor-length. If the received backlight power is not sufficient to supply the whole circuitry, at least the battery lifetime can be increased or the circuitry can be used for solar-recharging while the receiver is not in use.

According to this aspect, an electronic light detection circuit for a laser leveling receiver, which comprises a photosensitive element, in particular one or more photodiodes embodied as solar cells, and a power conversion circuitry that suppresses and converts backlight energy picked up by the photosensitive element and at least partially supplies the laser leveling receiver with the power comprised in the backlight, could also be claimed independently of the other aspects of the present invention.

What is claimed is:

1. An electronic light detection circuit for detecting an intensity modulated light signal on a photosensitive element under a backlight condition, comprising:
   said photosensitive element, including a light position detector for detecting a striking position of the light signal spot within a detection window;
   an amplifier with high input resistance connected to an output of said photosensitive element; and
   backlight suppression circuitry connected to the output of the photosensitive element in parallel to the amplifier, the backlight suppression circuitry including an electronic active resonator structure with at least one operational amplifier, configured to provide a load impedance to an output of the photosensitive element with:
   a low load impedance for low frequencies for suppression of natural and artificial backlight-saturation of the photosensitive element, and
   a high load impedance at the frequency of intensity modulation, wherein the low load impedance is lower than the high load impedance for backlight suppression by draining low frequency photo-induced currents from the output of the photosensitive element.

2. The circuitry according to claim 1, wherein:
   the high load impedance is in the range of or higher than an input impedance of the amplifier connected in parallel.

3. The circuitry according to claim 1, wherein the photosensitive element comprises:
   a transimpedence amplifier with a subsequent analog to digital converter.

4. The circuitry according to claim 1, wherein:
   the low load impedance operates for the frequency range of zero to twice the mains frequency; and
   the high load impedance is matched to the impedance of the photosensitive element for transmission of the modulated signal to the amplifier.

5. The circuitry according to claim 1, wherein
   the active resonator structure provides a load impedance to the output of the photosensitive element for high frequency ranges above modulation frequency, which is lower than the high load impedance at modulation frequency.

6. The circuitry according to claim 1, wherein:
the active resonator structure is a gyrator structure which comprises only non-inductive electronic components and has an inductive frequency characteristic; and
the low and the high load impedance between zero and modulation frequency differs by at least 20 dB, with the low impedance being below 1 kOhm at frequencies below 1 kHz and the high impedance being above 10 kOhm at the modulation frequency.

7. The circuitry according to claim 1, wherein:
the active resonator structure includes an operational amplifier configured as unity gain buffer;
the non-inverting input is coupled to the signal by a capacitive component and grounded by a high impedance resistor component having a resistance of at least 100 kOhm;
the inverting input is coupled to the signal by a low impedance resistor component with a resistance below 10 kOhm, and also coupled to the output of the operational amplifier; and
an inductance-component is connected in series to the low impedance resistor component.

8. The circuitry according to claim 1, wherein:
the active resonator structure has an adjustable impedance over frequency characteristic by adjusting or switching at least one electronic component comprised in the active resonator structure;
an input impedance of the active resonator structure at low-, modulation- and/or high-frequencies is adjustable and/or the modulation frequency is shiftable; and
the frequency characteristic is adjustable online during operation.

9. The circuitry according to claim 1, wherein:
the impedance characteristic over frequency of the active resonator is linearizes the detection circuit readout characteristic at modulation frequency by the high load impedance at modulation frequency for a linear positional readout of the striking position of the light signal spot at the photosensitive element at modulation frequency.

10. The circuitry according to claim 1, wherein:
the active resonator has a low pass frequency characteristic, with a low load impedance thereof at zero frequency being lower than a high load impedance thereof at modulation frequency, thereby actively draining currents induced by background light from the output of the photosensitive element.

11. The circuitry according to claim 10, wherein:
the load impedance at zero and modulation frequency differs by at least factor 100, with the low impedance being below 1 kOhm at the low frequencies below 1 kHz and the high impedance being above 10 kOhm at the frequency of the modulated light signal.

12. The circuitry according to claim 1, wherein the photosensitive element comprises:
one or more PSD-substrates based on the lateral photoelectric effect.

13. The circuitry according to claim 1, wherein the photosensitive element comprises:
one or more photodiodes in a BiCell arrangement.

14. A laser leveling system, comprising:
a laser projection device for emitting a laser plane by rotating a laser beam or emitting a pulsed laser line; and
a light beam position detector for determining a striking position of the laser plane within a detection window, including circuitry according to claim 1.

15. A method for evaluating a light spot in a backlight condition by a photosensitive element in a leveling laser receiver, comprising:
applying the light spot to the active surface of the photosensitive element to achieve a modulated light intensity on the photosensitive element;
generating at least one electrical signal dependent on the light spot intensity and the backlight condition;
evaluating the electrical signal, including amplification of the electrical signal with a high input impedance amplifier and a subsequent conversion from analog to digital; and
actively draining a low frequency part of the electrical signal resulting from backlight by an active resonator structure at the output of the photosensitive element, having a low impedance for low frequencies, from zero to twice the mains frequency, for avoiding backlight saturation of the photoelectric element by draining a low frequency part of the electrical signal, while having a high impedance at modulation frequency for maintaining a high level of a modulation frequency part of the electrical signal for evaluation wherein the low impedance is lower than the high impedance, resulting in a reduced draining for the modulation frequency part than for the low frequency part.

16. The method according to claim 15, further comprising:
based on the evaluated electrical signal, evaluating a position of the light spot within a detection window that includes the photosensitive element.

17. The method according to claim 15, wherein:
the low impedance is lower than the high impedance by a factor of at least ten.

18. The method according to claim 17, wherein:
the low impedance is lower than the high impedance by a factor of at one hundred.

19. The method according to claim 17, further comprising:
adjusting the active resonator structure by a switching or reconfiguring of the impedance characteristic over frequency of the active resonator by adjusting electrical components of the active resonator, including at least one of adjusting an impedance of the active resonator structure at low frequency, modulation frequency and/or above modulation frequency and/or shifting its critical frequency.

20. The method according to claim 17, wherein:
the draining is done electrically in parallel to evaluating and the active resonator structure is providing an inductance to series resistance ratio being higher than the inductance to series resistance ratio of a passive inductive component.

21. A method of extending a distance over which a laser leveling system is operable, the laser leveling system including a laser transmitter and a laser receiver, the method comprising:
performing the method of claim 17 in the laser receiver, thereby improving signal to background and noise ratio.

22. A method of reducing required transmission energy of a laser leveling transmitter in backlight conditions, in a laser alignment system that includes the laser transmitter and a laser receiver, the method comprising:
performing the method of claim 17 in the laser receiver.

* * * * *